US008255942B2

(12) United States Patent
Perry, II

(10) Patent No.: US 8,255,942 B2
(45) **Date of Patent: *Aug. 28, 2012**

(54) BROADCAST AREA AUTHENTICATION

(75) Inventor: Jack F. Perry, II, Marion, IA (US)

(73) Assignee: Syncbak, Inc.

(*) Notice: Subject to any disclaimer, the term of this patent is extended or adjusted under 35 U.S.C. 154(b) by 211 days.

This patent is subject to a terminal disclaimer.

(21) Appl. No.: 12/784,785

(22) Filed: May 21, 2010

(65) Prior Publication Data

US 2011/0173690 A1 Jul. 14, 2011

Related U.S. Application Data

(60) Provisional application No. 61/295,054, filed on Jan. 14, 2010.

(51) Int. Cl.
*H04N 7/16* (2011.01)

(52) U.S. Cl. .............. 725/25; 725/27; 725/62; 455/411; 713/168; 713/169; 379/142.05; 380/258

(58) Field of Classification Search .................... 725/25, 725/27, 30–31, 62–66, 93–97; 713/168, 713/169; 455/411; 379/142.05; 380/258
See application file for complete search history.

(56) References Cited

U.S. PATENT DOCUMENTS

| | | | | |
|---|---|---|---|---|
| 6,252,547 | B1 | 6/2001 | Perry | |
| 6,324,694 | B1 * | 11/2001 | Watts et al. | 725/32 |
| 6,714,759 | B2 | 3/2004 | Perry | |
| 6,732,179 | B1 * | 5/2004 | Brown et al. | 709/229 |
| 7,099,655 | B2 * | 8/2006 | Song et al. | 455/411 |
| 7,502,832 | B2 * | 3/2009 | San Andres et al. | 709/216 |
| 7,600,120 | B2 * | 10/2009 | Monteiro et al. | 713/168 |
| 8,082,591 | B2 * | 12/2011 | Gu et al. | 726/29 |
| 2004/0261092 | A1 * | 12/2004 | Addington et al. | 725/25 |
| 2008/0080408 | A1 | 4/2008 | Gao | |

(Continued)

FOREIGN PATENT DOCUMENTS

| | | | |
|---|---|---|---|
| CN | 1835641 | A | 9/2006 |

(Continued)

OTHER PUBLICATIONS

International Search Report and Written Opinion from International Application No. PCT/US2011/021226 dated Aug. 22, 2011.

(Continued)

*Primary Examiner* — Nicholas Corbo
(74) *Attorney, Agent, or Firm* — Alston & Bird LLP

(57) ABSTRACT

Systems, methods, apparatus, and computer program products are provided for authenticating local and remote devices associated with a broadcast area. For example, in one embodiment, a broadcast station can broadcast a first over-the-air broadcast that includes a token. A local device can scan for and identify the token in the first over-the-air broadcast it receives. The local device can then transmit the received token and user registration to an authentication server. The authentication server can use the token and user registration information to create a unique broadcast identifier. The authentication server can then transmit the unique broadcast identifier to the broadcast station and the local device. The broadcast station then broadcasts a second over-the-air broadcast that includes a unique broadcast identifier. Once the local device receives the unique broadcast identifier from the second over-the-air broadcast and the authentication server, it can be authenticated as being in the broadcast area.

28 Claims, 11 Drawing Sheets

U.S. PATENT DOCUMENTS

| | | | | |
|---|---|---|---|---|
| 2008/0254739 | A1 | 10/2008 | Kidd | |
| 2008/0301736 | A1 * | 12/2008 | Heilbron et al. | 725/61 |
| 2009/0125950 | A1 * | 5/2009 | Chaudhry et al. | 725/64 |
| 2009/0165032 | A1 * | 6/2009 | Burke et al. | 725/23 |
| 2009/0172784 | A1 * | 7/2009 | Park et al. | 726/4 |
| 2010/0100898 | A1 * | 4/2010 | Pfleging et al. | 725/28 |
| 2010/0125511 | A1 * | 5/2010 | Jouret et al. | 705/27 |
| 2011/0154383 | A1 * | 6/2011 | Hao et al. | 725/8 |
| 2011/0219229 | A1 * | 9/2011 | Cholas et al. | 713/168 |

FOREIGN PATENT DOCUMENTS

| | | | |
|---|---|---|---|
| CN | 101626573 | A | 1/2010 |
| EP | 1898645 | A1 | 3/2008 |
| EP | 2015576 | A1 | 1/2009 |

OTHER PUBLICATIONS

International Search Report and Written Opinion from International Application No. PCT/US2011/021234 dated Aug. 22, 2011.

Notice of Allowance dated Apr. 23, 2012, for U.S. Appl. No. 12/784,777, filed May 21, 2010.

Notice of Allowance dated Apr. 23, 2012, for U.S. Appl. No. 12/784,783, filed May 21, 2010.

Notice of Allowance dated Apr. 23, 2012, for U.S. Appl. No. 12/784,791, filed May 21, 2010.

Notice of Allowance dated Apr. 27, 2012, for U.S. Appl. No. 12/872,595, filed Aug. 31, 2010.

Notice of Allowance dated May 1, 2012, for U.S. Appl. No. 12/872,681, filed Aug. 31, 2010.

Notice of Allowance dated Apr. 27, 2012, for U.S. Appl. No. 12/872,757, filed Aug. 31, 2010.

Notice of Allowance dated Apr. 27, 2012, for U.S. Appl. No. 12/872,799, filed Aug. 31, 2010.

* cited by examiner

BROADCAST AREA AUTHENTICATION

CROSS-REFERENCE TO RELATED APPLICATIONS

This application claims priority to U.S. Provisional Application No. 61/295,054, filed Jan. 14, 2010, which is hereby incorporated herein in its entirety by reference.

BACKGROUND

At present, there are over 700 major network television affiliates, 1,600 smaller network television affiliates, and 3,000 community broadcasters across the United States. Currently, these broadcasters are unable to provide their over-the-air broadcasts, for example, via the Internet because of regulations limiting consumption to users located within their respective broadcast areas. Thus, broadcasters need a solution that will allow them to deliver their over-the-air broadcasts (and/or other content) via the Internet to users located (or having a presence) within or proximate their respective broadcast areas.

BRIEF SUMMARY

In general, embodiments of the present invention provide systems, methods, apparatus, and computer program products for authenticating devices associated with a broadcast area.

In accordance with one aspect, a method for authenticating a local device in a broadcast area is provided. In one embodiment, the method comprises (1) receiving a first over-the-air broadcast from a broadcast station, wherein (a) the broadcast station is associated with a broadcast area and (b) the first over-the-air broadcast comprises a token; (2) transmitting the token and user information to an authentication server; and (3) receiving a unique broadcast identifier generated by the authentication server, wherein the unique broadcast identifier is generated based at least in part on the user information and the token transmitted to the authentication server. The method may also comprise (4) receiving a second over-the-air broadcast from the broadcast station and (5) in response to receiving (a) the unique broadcast identifier from the authentication server and (b) the unique broadcast identifier via the second over-the-air broadcast from the broadcast station, authenticating the local device.

In accordance with yet another aspect, a computer program product for authenticating a local device in a broadcast area is provided. The computer program product may comprise at least one computer-readable storage medium having computer-readable program code portions stored therein, the computer-readable program code portions comprising executable portions configured to (1) receive a first over-the-air broadcast from a broadcast station, wherein (a) the broadcast station is associated with a broadcast area and (b) the first over-the-air broadcast comprises a token; (2) transmit the token and user information to an authentication server; and (3) receive a unique broadcast identifier generated by the authentication server, wherein the unique broadcast identifier is generated based at least in part on the user information and the token transmitted to the authentication server. In one embodiment, the computer-readable program code portions may also comprise executable portions configured to (4) receive a second over-the-air broadcast from the broadcast station and (5) in response to receiving (a) the unique broadcast identifier from the authentication server and (b) the unique broadcast identifier via the second over-the-air broadcast from the broadcast station, authenticate the local device.

In accordance with yet another aspect, an apparatus comprising at least one processor and at least one memory including computer program code is provided. In one embodiment, the at least one memory and the computer program code may be configured to, with the processor, cause the apparatus to at least (1) receive a first over-the-air broadcast from a broadcast station, wherein (a) the broadcast station is associated with a broadcast area and (b) the first over-the-air broadcast comprises a token; (2) transmit the token and user information to an authentication server; and (3) receive a unique broadcast identifier generated by the authentication server, wherein the unique broadcast identifier is generated based at least in part on the user information and the token transmitted to the authentication server. The at least one memory and the computer program code may also be configured to, with the processor, cause the apparatus to at least (4) receive a second over-the-air broadcast from the broadcast station, wherein the second over-the-air broadcast comprises the unique broadcast identifier; and (5) in response to receiving (a) the unique broadcast identifier from the authentication server and (b) the unique broadcast identifier via the second over-the-air broadcast from the broadcast station, authenticate the local device.

In accordance with yet another aspect, a method for authenticating a remote device outside a broadcast area is provided. In one embodiment, the method comprises registering a remote device with a local device for access to content associated with a broadcast area, wherein the local device has been authenticated as being associated with the broadcast area.

In accordance with still another aspect, a computer program product for authenticating a remote device outside a broadcast area is provided. The computer program product may comprise at least one computer-readable storage medium having computer-readable program code portions stored therein, the computer-readable program code portions comprising executable portions configured to register a remote device with a local device for access to content associated with a broadcast area, wherein the local device has been authenticated as being associated with the broadcast area.

In accordance with yet another aspect, an apparatus comprising at least one processor and at least one memory including computer program code is provided. In one embodiment, the at least one memory and the computer program code may be configured to, with the processor, cause the apparatus to at least register a remote device with a local device for access to content associated with a broadcast area, wherein the local device has been authenticated as being associated with the broadcast area.

In accordance with another aspect, a method for authenticating a local device in a broadcast area is provided. In one embodiment, the method comprises (1) receiving a token and user information from a local device, wherein the token was received by the local device via a first over-the-air broadcast; (2) in response to receiving the token and the user information from the local device, generating a unique broadcast identifier based at least in part on the token and at least a portion of the user information; and (3) transmitting the unique broadcast identifier to a broadcast station, wherein the unique broadcast identifier is to be broadcast by the broadcast station via a second over-the-air broadcast. The method may also comprise (4) transmitting the unique broadcast identifier to the local device; and (5) receiving a notification that the local device has been authenticated in response to the local device receiving (a) the unique broadcast identifier from the authentication server and (b) the unique broadcast identifier via the second over-the-air broadcast from the broadcast station.

In accordance with still another aspect, a computer program product for authenticating a local device in a broadcast area is provided. The computer program product may comprise at least one computer-readable storage medium having computer-readable program code portions stored therein, the computer-readable program code portions comprising executable portions configured to (1) receive a token and user information from a local device, wherein the token was received by the local device via a first over-the-air broadcast; (2) in response to receiving the token and the user information from the local device, generate a unique broadcast identifier based at least in part on the token and at least a portion of the user information; and (3) transmit the unique broadcast identifier from an authentication server to a broadcast station, wherein the unique broadcast identifier is to be broadcast by the broadcast station via a second over-the-air broadcast. In one embodiment, the computer-readable program code portions may also comprise executable portions configured to (4) transmit the unique broadcast identifier from the authentication server to the local device; and (5) receive a notification that the local device has been authenticated in response to the local device receiving (a) the unique broadcast identifier from the authentication server and (b) the unique broadcast identifier via the second over-the-air broadcast from the broadcast station.

In accordance with yet another aspect, a method for authenticating a local device in a broadcast area is provided. In one embodiment, the method comprises (1) broadcasting a first over-the-air broadcast, wherein (a) the broadcast station is associated with a broadcast area and (b) the first over-the-air broadcast comprises a token; 2) receiving a unique broadcast identifier from an authentication server, wherein the unique broadcast identifier is generated based at least in part on (a) the token in the first over-the-air broadcast and (b) at least a portion of user information transmitted from a local device that received the token in the first over-the-air broadcast; and (3) broadcasting a second over-the-air broadcast in the broadcast area, wherein the second over-the-air broadcast comprises the unique broadcast identifier.

In accordance with another aspect, a broadcast system for authenticating a local device in a broadcast area is provided. In one embodiment, the broadcast system may comprise one or more processors, one or more memory storage areas, and one or more transmitters. The broadcast system may also be configured to: (1) broadcast a first over-the-air broadcast, wherein (a) the first over-the-air broadcast comprises a token and (b) the broadcast system is associated with a broadcast area; (2) receive a unique broadcast identifier from an authentication server, wherein the unique broadcast identifier is generated based at least in part on (a) the token in the first over-the-air broadcast and (b) at least a portion of user information that identifies a local device that received the token in the first over-the-air broadcast; and (3) broadcast a second over-the-air broadcast in the broadcast area, wherein the second over-the-air broadcast comprises the unique broadcast identifier.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
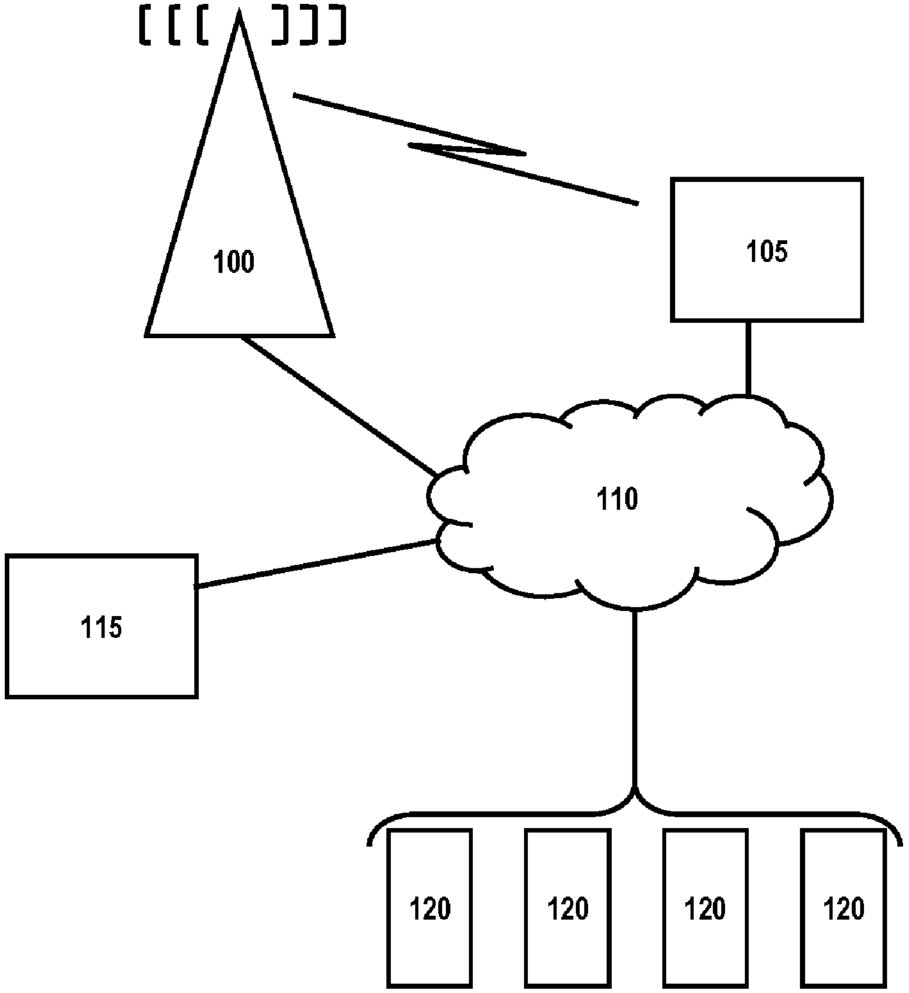
FIG. 1 is an overview of a system that can be used to practice various embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. Like numbers refer to like elements throughout.

I. Methods, Apparatus, Systems, and Computer Program Products

As should be appreciated, various embodiments may be implemented in various ways, including as methods, apparatus, systems, or computer program products. Accordingly, various embodiments may take the form of an entirely hardware embodiment or an embodiment in which a processor is programmed to perform certain steps. Furthermore, various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Various embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. Exemplary System Architecture

FIG. 1 provides an illustration of a system that may be used in conjunction with various embodiments of the present invention. As shown in FIG. 1, the system may include one or more broadcast stations 100, one or more local devices 105, one or more networks 110, one or more authentication servers 115, and one or more remote devices 120. Each of the components of the system may be in electronic communication with, for example, one another over the same or different wireless or wired networks including, for example, a wired or wireless Personal Area Network ("PAN"), Local Area Network ("LAN"), Metropolitan Area Network ("MAN"), Wide Area Network ("WAN"), and/or the like. Additionally, while FIG. 1 illustrates certain system entities as separate, standalone entities, the various embodiments are not limited to this particular architecture.

1. Broadcast Station

Figure 2:
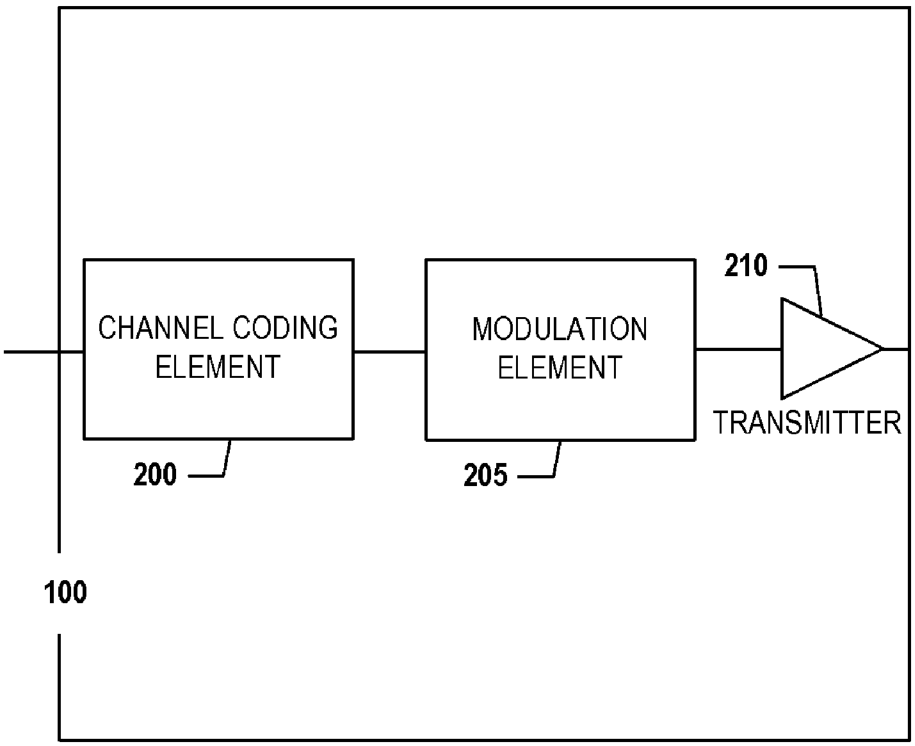
FIG. 2 is an exemplary schematic of a broadcast station according to one embodiment of the present invention.

FIG. 2 provides an exemplary schematic representative of a broadcast station 100 (and/or system) that can be used in conjunction with embodiments of the present invention. The broadcast station 100 may be owned and/or operated by a broadcaster (e.g., KCRG-TV9) and associated with a broadcast area (e.g., Cedar Rapids, Iowa or the Atlanta, Ga. metropolitan area). Broadcasters may have rights to distribute content within broadcast areas (e.g., within local, regional, or other geographic service areas), such as free-to-air television or free-to-view television. As will be recognized, a broadcaster may have one or more broadcast stations 100 depending on the geographic area the broadcast area includes. A broadcast station 100 may include various components to broadcast/transmit content and/or data via an over-the-air ("OTA") broadcast (e.g., an OTA signal). As shown in FIG. 2, in one embodiment, the broadcast station 100 may include a channel coding element 200, a modulation element 205, and a transmitter 210. Although not shown, the broadcast station 100 may also include various other components, such as audio subsystems, video subsystems, multiplexers, exciters, drivers, amplifiers, network interfaces, processing elements, and/or the like. Via these elements, for instance, the broadcast station 100 can broadcast/transmit OTA broadcasts within a broadcast area (e.g., broadcast/transmit OTA signals in a one-to-many configuration). The broadcast station 100 may broadcast/transmit the OTA broadcast using a variety of standards and protocols, such as Advanced Television Systems Committee ("ATSC"), Terrestrial Integrated Services Digital Broadcasting ("ISDB-T"), Terrestrial Digital Multimedia Broadcasting ("T-DMB"), Digital Video Broadcasting—Terrestrial ("DVB-T"), Digital Video Broadcasting—Handheld ("DVB-H"), Satellite Terrestrial Interactive Multi-service Infrastructure ("STiMi"), National Television System Committee ("NTSC") standards and protocols, and/or the like.

As indicated, the OTA broadcast may include both content and data. Generally, the term "content" may refer to any type of media, whether audio, video, text, and/or the like. For example, content may include television broadcasts (e.g., live local newscasts), television programs (e.g., The Office), movies (e.g., video-on-demand ("VOD")), datacasts, music, images, videos, text, webpages, and/or the like. In one embodiment, the OTA broadcasts may be limited to linear media. The term "data" may refer to any type of data, including ancillary data, control data, conditional access control data, data associated with program audio and/or video services (e.g., closed captioning), and/or the like.

Although, not shown, the broadcast station 100 (or other broadcast facility located proximate or remote from the broadcast station 100) may also comprise one or more components for providing content to local and remote devices 105, 120 via a network such as the Internet. These components may include VOD systems, Internet broadcast systems, content servers, and/or the like. Thus, via such components, a broadcaster can provide a variety of content (e.g., linear and non-linear media) via the Internet to local and remote devices 105, 120.

It will be appreciated that one or more of the broadcast station's 100 components and other broadcaster components may be located remotely from one another. Furthermore, one or more of the components may be combined and additional components performing functions described herein may be included.

2. Local Device

Figure 3:
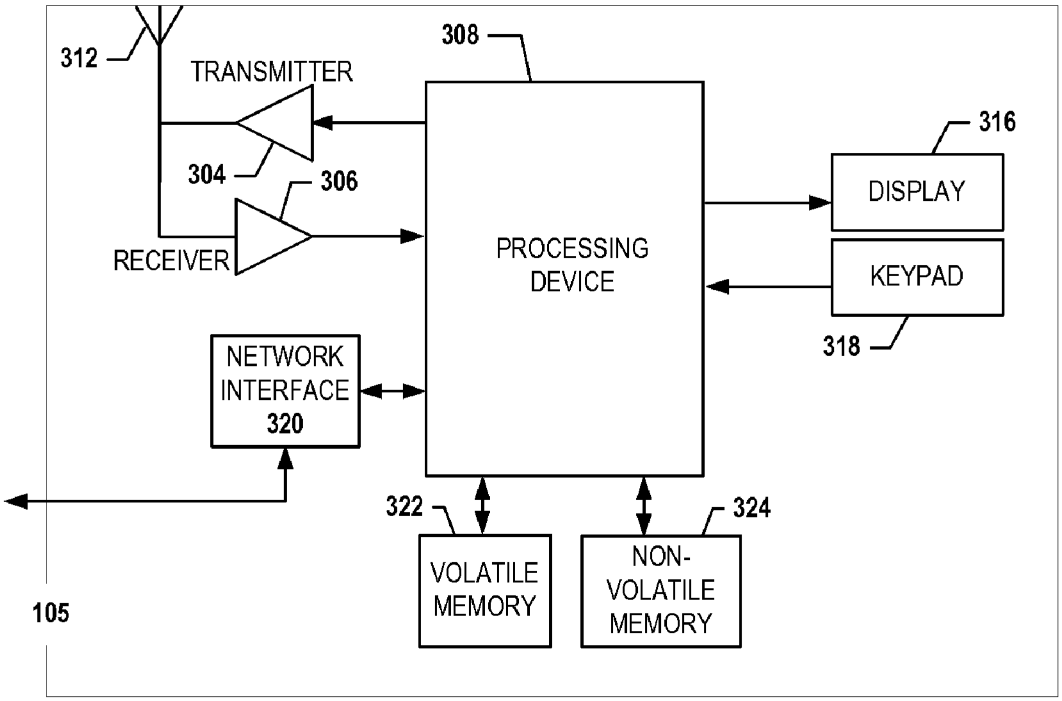
FIG. 3 is an exemplary schematic of a local device according to one embodiment of the present invention.

FIG. 3 provides an exemplary schematic representative of a local device 105 that can be used in conjunction with embodiments of the present invention, such as a computing device or television. In general, the term "local device" may refer to, for example, a device located within a specific service area (e.g., a device located within a broadcaster's broadcast area). As shown in FIG. 3, the local device 105 may include an antenna 312, a transmitter 304, a receiver 306, a network interface 320, and a processing device 308 (e.g., a processor, controller, and/or the like) that provides signals to the transmitter 304 (and/or network interface 320) and receives signals from receiver 306 (and/or network interface 320).

The signals provided to the transmitter 304 (and/or network interface 320) and received from the receiver 306 (and/or network interface 320) may include signaling information in accordance with an air interface standard of applicable wireless systems. In this regard, the local device 105 may be capable of operating with one or more air interface standards, communication protocols, modulation types, and access types. More particularly, the local device 105 may operate in accordance with any of a number of second-generation ("2G"), third-generation ("3G"), fourth-generation ("4G"), ATSC, ISDB-T, T-DMB, DVB-T, DVB-H, STiMi standards and protocols, and/or the like. Further, for example, the local device 105 may operate in accordance with any of a number of different wireless networking techniques, including Bluetooth, IEEE 802.11 ("Wi-Fi"), 802.16 ("WiMAX"), ultra wideband ("UWB"), and/or the like. Via these communication standards and protocols, the local device 105 can communicate with the authentication server 115, for example, and/or receive broadcasts/transmissions from the broadcast station 100. The local device 105 can also download changes, add-ons, and updates, for instance, to its firmware, software (e.g., including modules), and operating system.

The local device 105 may also comprise a user interface (that can include a display 316 coupled to a processing device 308) and/or a user input interface (coupled to the processing device 308). The user input interface can comprise any of a number of devices allowing the local device 105 to receive input and/or data, such as a keypad 318, a touch display, voice or motion interfaces, or other input device such as a remote control. The local device 105 can also include volatile memory 322 and/or non-volatile memory 324, which can be embedded and/or may be removable. For example, the non-volatile memory may be embedded or removable multimedia memory cards ("MMCs"), secure digital ("SD") memory cards, Memory Sticks, EEPROM, flash memory, hard disk, or the like. The memory can store any of a number of pieces or amount of information and data used by the local device 105 to implement the functions of the local device 105. The memory can also store content, such as program code for an application and/or other programs.

3. Authentication Server

Figure 4:
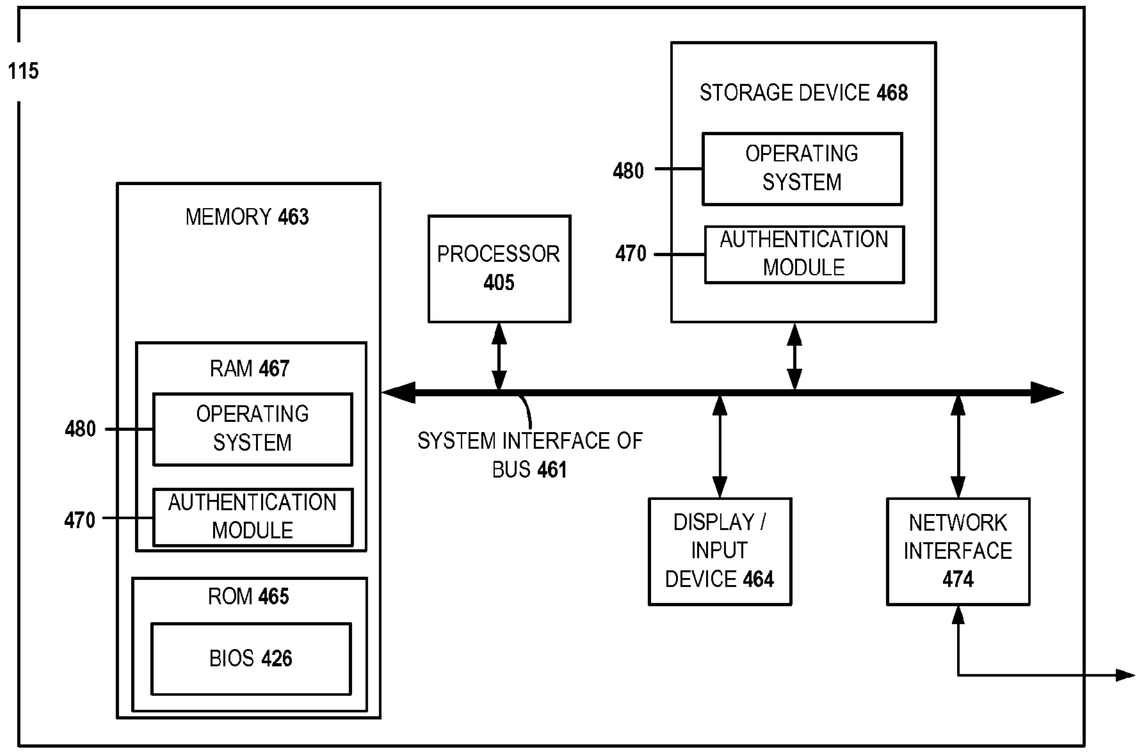
FIG. 4 is an exemplary schematic of an authentication server according to one embodiment of the present invention.

FIG. 4 provides an exemplary schematic of an authentication server 115 according to one embodiment of the present invention. In general, the term "authentication server" may refer to, for example, any computer, computing device, mobile phone, desktop, notebook or laptop, distributed system, broadcast station, server, blade, gateway, switch, or other processing device adapted to perform the functions described herein. As will be understood from this figure, in this embodiment, the authentication server 115 includes a processor 405 that communicates with other elements within the authentication server 115 via a system interface or bus 461. The processor 405 may be embodied in a number of different ways. For example, the processor 405 may be embodied as a processing element, a coprocessor, a controller or various other processing devices including integrated circuits such as, for example, an application specific integrated circuit ("ASIC"), a field programmable gate array ("FPGA"), a hardware accelerator, or the like.

In an exemplary embodiment, the processor 405 may be configured to execute instructions stored in the device memory or otherwise accessible to the processor 405. As such, whether configured by hardware or other methods, or by a combination thereof, the processor 405 may represent an entity capable of performing operations according to embodiments of the present invention while configured accordingly. A display device/input device 464 for receiving and displaying content and/or data may also be included in the authentication server 115. This display device/input device 464 may be, for example, a keyboard or pointing device that is used in combination with a monitor. The authentication server 115 further includes memory 463, which may include both read only memory ("ROM") 465 and random access memory ("RAM") 467. The authentication server's ROM 465 may be used to store a basic input/output system ("BIOS") 426 containing the basic routines that help to transfer information to the different elements within the authentication server 115.

In addition, in one embodiment, the authentication server 115 may include at least one storage device 468, such as a hard disk drive, a CD drive, and/or an optical disk drive for storing information on various computer-readable media. The storage device(s) 468 and its associated computer-readable media may provide nonvolatile storage. The computer-readable media described above could be replaced by any other type of computer-readable media, such as embedded or removable MMCs, SD memory cards, Memory Sticks, EEPROM, flash memory, hard disk, or the like. Additionally, each of these storage devices 468 may be connected to the system bus 461 by an appropriate interface.

Furthermore, a number of program modules may be stored by the various storage devices 468 and/or within RAM 467. Such program modules may include an operating system 480 and an authentication module 470. These modules may control certain aspects of the operation of the authentication server 115 with the assistance of the processor 405 and operating system 480—although their functionality need not be modularized. For example, the authentication module 470 may be used to authenticate local devices 105 and/or remote devices 120. In addition to the program modules, the authentication server 115 may store or be connected to one or more databases with one or more tables stored therein.

Also located within the authentication server 115, in one embodiment, is a network interface 474 for interfacing with various computing entities, including the broadcast station 100. This communication may be via the same or different wired or wireless networks (or a combination of wired and wireless networks). For instance, the communication may be executed using a wired data transmission protocol, such as fiber distributed data interface ("FDDI"), digital subscriber line ("DSL"), Ethernet, asynchronous transfer mode ("ATM"), frame relay, data over cable service interface specification ("DOCSIS"), or any other wired transmission protocol. Similarly, the authentication server 115 may be configured to communicate via wireless external communication networks using any of a variety of protocols, such as 802.11, general packet radio service ("GPRS"), wideband code division multiple access ("W-CDMA"), or any other wireless protocol. Via these communication standards and protocols, the authentication server 115 can communicate with the local devices 105, remote devices 120, and broadcast stations 100. The authentication server 115 may also include receivers (not shown), transmitters (not shown), and other components (not shown) capable of operating in accordance with ATSC, ISDB-T, T-DMB, DVB-T, DVB-H, STiMi standards and protocols, and/or the like.

It will be appreciated that one or more of the authentication server's 115 components may be located remotely from other authentication server 115 components. Furthermore, one or more of the components may be combined and additional components performing functions described herein may be included in the authentication server 115. Moreover, the physical location and operation of the authentication server 115 may vary. For example, in one embodiment, the authentication server 115 may be operated by a party independent of the broadcaster and located remote from the broadcast station 100. In another embodiment, the authentication server 115 may be operated by a broadcaster, with the authentication server 115 being located at a broadcast facility such as the broadcast station 100.

4. Remote Device

Figure 5:
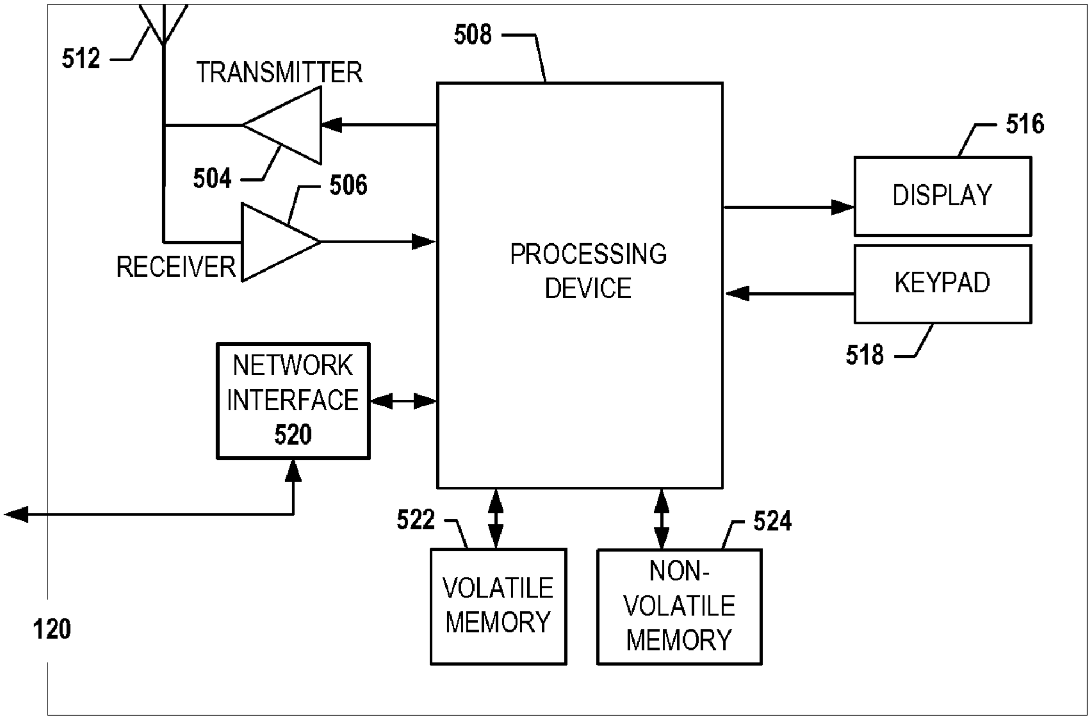
FIG. 5 is an exemplary schematic of a remote device according to one embodiment of the present invention.

FIG. 5 provides an exemplary schematic representative of a remote device 120 that can be used in conjunction with embodiments of the present invention, such as a computing device or television. In general, the term "remote device" may refer to, for example, a device located outside a specific service area when attempting to access content associated with the service area (e.g., a device located outside a broadcaster's broadcast area when attempting to access the broadcaster's content). As shown in FIG. 5, the remote device 120 may include an antenna 512, a transmitter 504, a receiver 506, a network interface 520, and a processing device 508 (e.g., a processor, controller, and/or the like) that provides signals to and receives signals from the transmitter 504 (and/or network interface 520) and receiver 506 (and/or network interface 520).

The signals provided to the transmitter 504 (and/or network interface 520) and received from the receiver 506 (and/or network interface 520) may include signaling information in accordance with an air interface standard of applicable wireless systems. For example, the remote device 120 may be capable of operating with one or more air interface standards, communication protocols, modulation types, and access types as described above with respect to the local device 105.

The remote device 120 may also comprise a user interface (that can include a display 516 coupled to a processing device 508) and/or a user input interface (coupled to the processing device 508). The user input interface can comprise any of a number of devices allowing the remote device 120 to receive input and/or data, such as a keypad 518, a touch display, voice or motion interfaces, or other input device. The remote device 120 can also include volatile memory 522 and/or non-volatile memory 524, which can be embedded and/or may be removable as described above with respect to the local device 105. The memory can store any of a number of pieces or amount of information and data used by the remote device 120, such as program code for an application and/or other programs.

III. Exemplary System Operation

Figure 6:
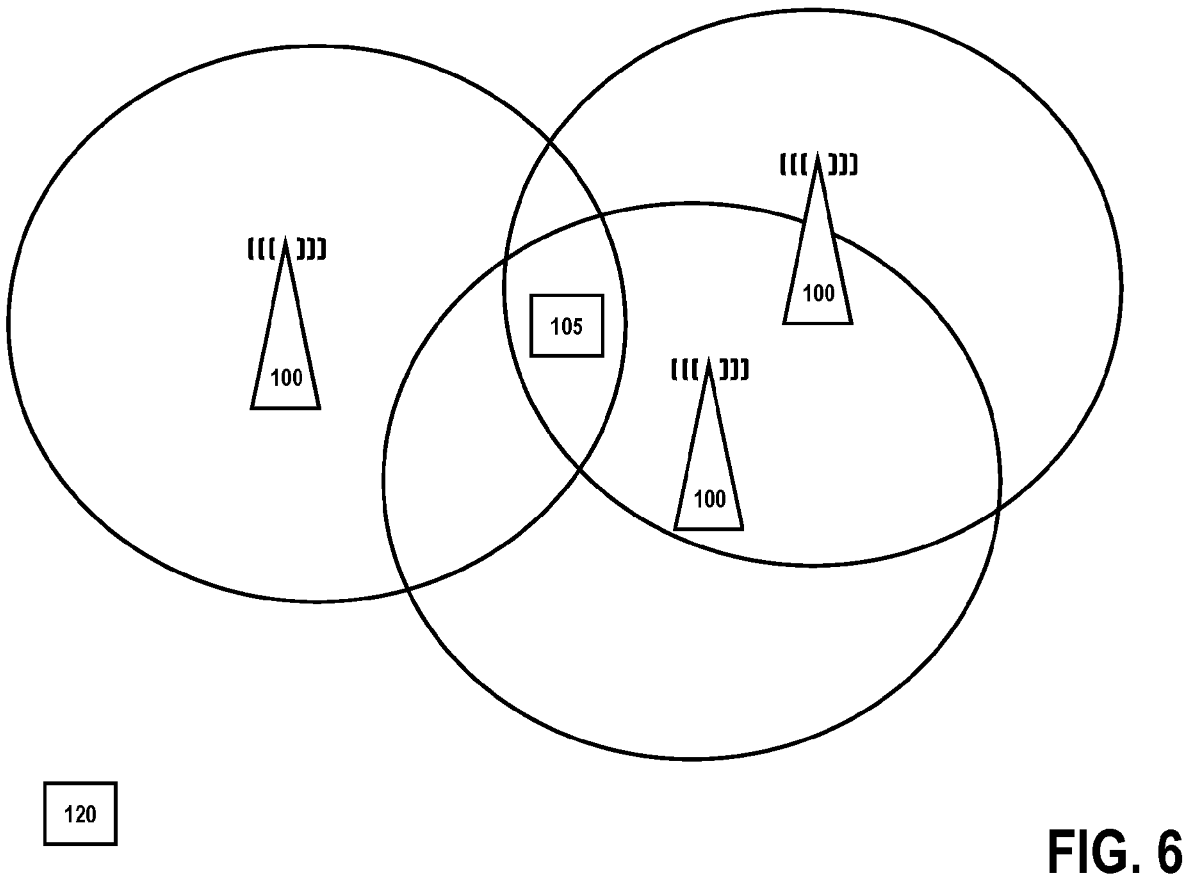
FIG. 6 shows broadcast areas served by broadcast stations according to one embodiment of the present invention.

Reference will now be made to FIGS. 6-11. FIG. 6 shows broadcast areas served by broadcast stations 100 according to one embodiment. FIGS. 7-10 are flowcharts illustrating operations and processes that can be used for broadcast area authentication according to one embodiment of the present invention. FIGS. 11A and 11B show illustrative unique broadcast identifiers. Via these concepts, a broadcaster can distribute OTA content, for example, via a network such as the Internet to only users located (or having a presence) in the broadcaster's broadcast area.

1. User Registration

Figure 7:
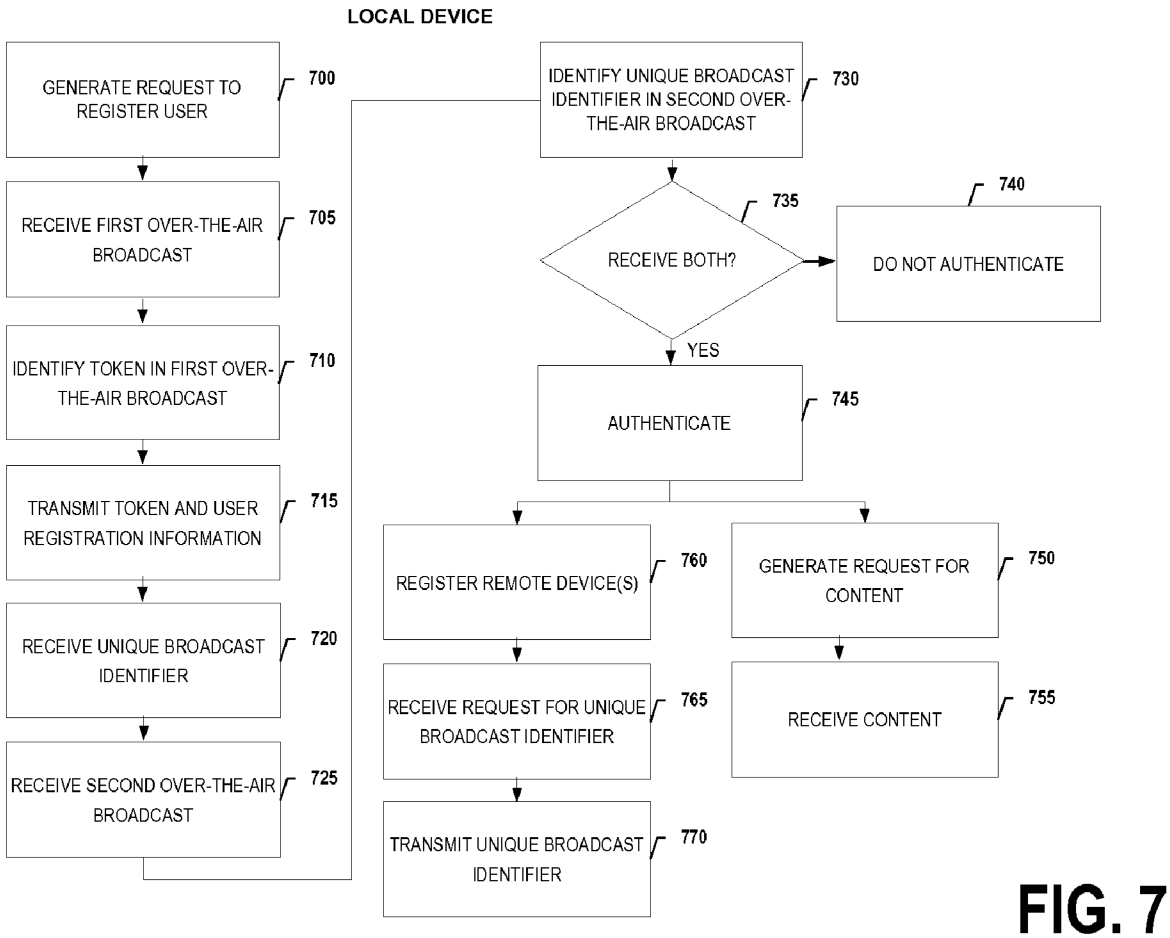
FIGS. 7-10 are flowcharts illustrating operations and processes that can be used in accordance with various embodiments of the present invention.
Figure 10:
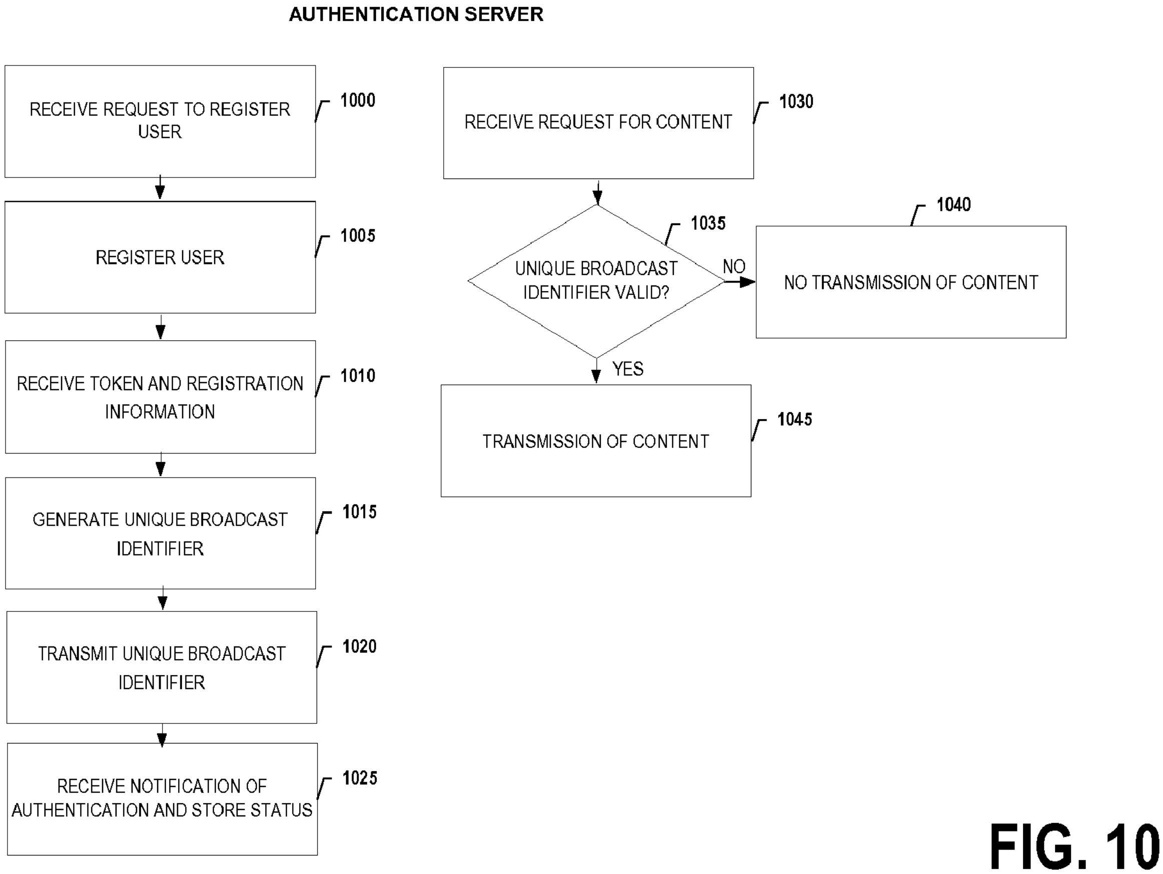

In one embodiment, as shown in FIGS. 7 and 10, the process begins by a local device 105 (e.g., via a user operating a local device 105) generating a request to register a user to access a broadcaster's content via a network such as the Internet (Block 700 of FIG. 7). The request may be a request, for example, to register the user directly with a specific broadcaster (e.g., KCRG-TV9) or an independent third party representing multiple broadcasters (e.g., www.syncbak.com). In one embodiment, the request to register the user may be executed via a module, program, or application that has been downloaded or preinstalled on the local device 105. In another embodiment, the request to register the user may be generated via a webpage of a broadcaster or an independent third party.

In one embodiment, the request to register the user includes user information. The user information may include a variety of information associated with the user and/or the local device 105. For example, the user information may include (a) the user's first and last name, (b) the user's address, (c) the user's zip code, (d) the user's telephone number, (e) a username (f) a charge card number, (g) a local device identifier, e.g., Media Access Control ("MAC") address or an Internet Protocol ("IP") address, and/or (h) the like. The user information may be used to uniquely identify the user and/or the local device 105.

As shown in FIG. 10, in one embodiment, the request to register the user is sent to and received by an authentication server 115 (Block 1000 of FIG. 10). As previously discussed, the physical location and operation of the authentication server 115 may vary. For example, the authentication server 115 may be operated by (a) a broadcaster or (b) an independent third party. Irrespective of ownership and/or operation, in response to receiving the request to register the user, the authentication server 115 can create a user account with the user information and electronically store at least a portion of the user information in association with the user account (Block 1005 of FIG. 10).

It should be noted that in various embodiments, the user account may be used to not only store information associated with the user and the local device 105, but additional local devices 105 (e.g., a personal computer and a television in the user's home) and/or remote devices 120 (e.g., a device located outside a broadcaster's broadcast area when attempting to access the broadcaster's content, such as a mobile phone or laptop). The user account and/or user information may be used to provide content to the local device 105 and/or remote device 120 via the Internet (or other network). In one embodiment, to provide content from the broadcaster to the local device 105 and/or remote device 120 via the Internet, for example, the local device 105 can be authenticated as being within or proximate the broadcaster's broadcast area.

2. Token Generation and Token Broadcast

Figure 9:
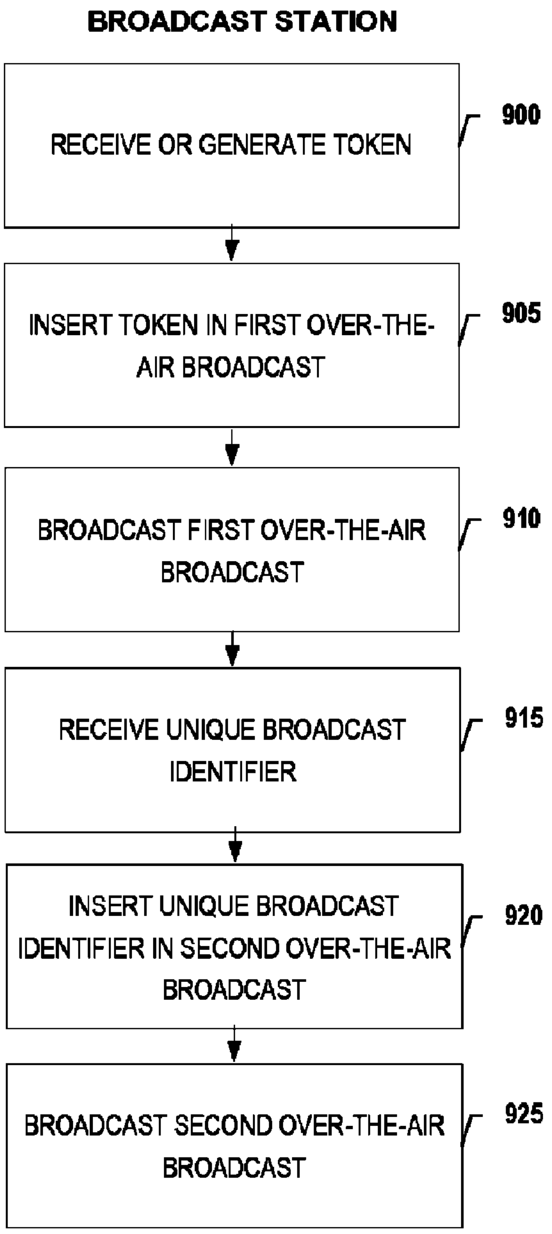

In one embodiment, as shown in FIG. 9, the authentication process may begin with the broadcast station 100. As indicated in Block 900 of FIG. 9, the broadcast station 100 can generate a token for insertion into an OTA broadcast, which may be referred to as a first OTA broadcast. In another embodiment, instead of generating the token, the broadcast station 100 can receive the token from a computing entity such as the authentication server 115. The token may comprise data or other information that uniquely identifies the broadcast station 100, the broadcaster, the broadcaster's broadcast area, a television channel associated with the broadcaster, and/or the like. In one embodiment, the token may be a unique alphanumeric identifier that identifies the broadcast station 100 broadcasting/transmitting the first OTA broadcast. Continuing with the above example, the token may be a unique alphanumeric identifier that identifies KCRG-TV9 in Cedar Rapids, Iowa.

As indicated in Block 905 of FIG. 9, after the token is generated, the broadcast station 100 can insert the token into the first OTA broadcast. In one embodiment, the broadcast station 100 may insert the token into the first OTA broadcast using the program and system information protocol ("PSIP") delivery schema or any of a variety of other approaches and techniques. For example, the broadcast station 100 may insert the token into the first OTA broadcast as an ancillary data stream.

In one embodiment, after inserting the token into the first OTA broadcast, the broadcast station 100 broadcasts/transmits the first OTA broadcast comprising the token (Block 910 of FIG. 9). The first OTA broadcast can be broadcast/transmitted in the broadcaster's broadcast area as a one-to-many broadcast. As will be recognized, the first OTA broadcast may be relayed, repeated, or otherwise transmitted via multiple broadcast stations 100 or devices within the broadcast area. Thus, the first OTA broadcast can be received by any local devices 105 within or proximate the broadcaster's broadcast area.

3. Token Reception and Token Identification

In various embodiments, an attenuated OTA broadcast (e.g., an attenuated signal) may still be received and used to identify the token therein because the signal carrying the OTA broadcast need only be sufficient to allow identification of the token. In other words, as the OTA broadcast (e.g., OTA signal) reaches the local device 105, the OTA broadcast need only be sufficient for the local device 105 to recover the data, not the content (e.g., audio and/or video). This approach may allow for local devices 105 that were considered out of range to recover the content of an OTA broadcast to receive the OTA broadcast and identify the token therein.

In one embodiment, as shown in FIG. 6, a local device 105 may receive OTA broadcasts from any number of broadcast stations 100. For instance, a local device 105 located in Cedar Rapids, Iowa may simultaneously receive 12-15 OTA broadcasts. In one embodiment, each OTA broadcast may comprise a token that identifies its associated broadcast station 100, broadcaster, broadcaster's broadcast area, television channel, and/or the like. Thus, at any time, the local device 105 may receive many OTA broadcasts from various broadcast stations 100 and identify the tokens respectively broadcast/transmitted therein.

In one embodiment, as a result of the broadcast station 100 broadcasting/transmitting the first OTA broadcast, the local device 105 receives the first OTA broadcast (Block 705 of FIG. 7). In part, this is possible because the local device 105 is located within or proximate the broadcaster's broadcast area. As the local device receives OTA broadcasts, the local device 105 scans for and identifies (e.g., via a downloaded or preinstalled module, program, or application) tokens in the OTA broadcasts it receives (Block 710 of FIG. 7). Continuing with the above example, the local device 105 scans for and identifies the token in the first OTA broadcast identifying KCRG-TV9 in Cedar Rapids, Iowa.

In various embodiments, receipt of the first OTA broadcast and identification of the token may not be accessible to the user of the local device 105. By limiting access to the token, the broadcaster can limit erroneous authentications of local devices 105. As will be recognized, a variety of techniques and approaches may be used to limit user access to this part of the process.

In one embodiment, after identifying the token in the first OTA broadcast, the local device 105 transmits the token and at least a portion of the user information to the authentication server 115 via a network such as the Internet (Block 715 of FIG. 7). As indicated, the user information may include (a) the user's first and last name, (b) the user's address, (c) the user's zip code, (d) the user's telephone number, (e) a username (f) a charge card number, (g) a local device identifier, e.g., MAC address or IP address, and/or (h) the like. The token and user information can then be used by the authentication server 115 as part of the process in authenticating the local device 105.

4. Unique Broadcast Identifier Generation

As indicated in Block 1010 of FIG. 10, in one embodiment, the authentication server 115 is transmitted and receives the token and the user information from the local device 105. The authentication server 115 can then generate a unique broadcast identifier based at least in part, for example, on the token and the user information it receives from the local device 105 (Block 1015 of FIG. 10).

Figure 11A:
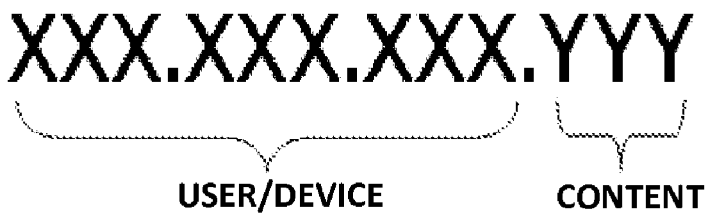
FIGS. 11A and 11B show unique broadcast identifiers according to one embodiment of the present invention.
Figure 11B:
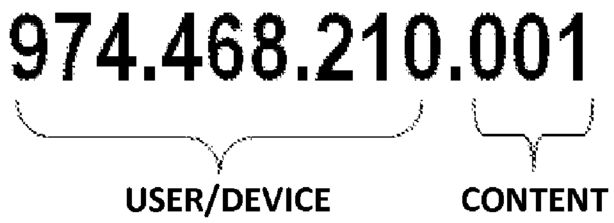

As described, the token can be used to uniquely identify the broadcast station 100, the broadcaster, the broadcaster's broadcast area, a television channel associated with the broadcaster, and/or the like. Similarly, the user information can be used to uniquely identify the user and/or the corresponding local device 105. Thus, in one embodiment, the unique broadcast identifier generated by the authentication server 115 can be used to uniquely identify the user, the local device 105, and/or the content (e.g., channels or broadcasters) for which the local device 105 is being or has been authenticated. For example, the unique broadcast identifier may comprise 12 characters. As shown in FIGS. 11A and 11B, the first 9 characters of the unique broadcast identifier may comprise a user/local device portion. The user/local device portion may be used to uniquely identify the user and/or the local device 105. For instance, 974.468.210 may be the first 9 characters of the unique broadcast identifier that uniquely identify the user and/or the local device 105. The last three characters of the unique broadcast identifier may comprise a content portion. The content portion of the unique broadcast identifier may be used to identify the content (e.g., channels or broadcasters) for which the local device 105 is being or has been authenticated. For example, 001 may be the last 3 characters used in the unique broadcast identifier to identify the content (e.g., channels or broadcasters). Thus, continuing with the above example, 001 may be used to represent KCRG-TV9 in Cedar Rapids, Iowa. Accordingly, if the local device 105 is authenticated with a unique broadcast identifier of 974.468.210.001, the unique broadcast identifier may be used to indicate that the user and/or local device 105 has access rights to KCRG-TV9's content via the Internet (or other network).

Additionally, given that each broadcaster in the United States may have 19.4 megabits per second of spectrum available for broadcast, the broadcaster may be able to simultaneously provide (a) content that is free for user consumption and (b) premium content for which the user pays a fee (e.g., a micro-transaction fee) to access. In one embodiment, the unique broadcast identifier may be used as a key, for example, to access any premium content for which the user has paid.

In one embodiment, after generating the unique broadcast identifier, the authentication server 115 transmits the unique broadcast identifier to both the broadcast station 100 and the local device 105 (Block 1020 of FIG. 10). As indicated in Block 720 of FIG. 7, the local device 105 receives the unique broadcast identifier from the authentication server 115 and stores it, for example, in memory. Similarly, as indicated in Block 915 of FIG. 9, the broadcast station 100 receives the unique broadcast identifier from the authentication server 115 for broadcast/transmission via a second OTA broadcast.

5. Authentication

As indicated, the (a) local device 105 can receive the unique broadcast identifier from the authentication server 115 and (b) broadcast station 100 can receive the unique broadcast identifier from the authentication server 115. In one embodiment, the broadcast station 100 can then insert the unique broadcast identifier into a second OTA broadcast (Block 920 of FIG. 9). This may be executed, for example, using the PSIP delivery schema or any of a variety of other approaches and techniques. Thus, as previously described with regard to the first OTA broadcast, the broadcast station 100 can insert the unique broadcast identifier into the second OTA broadcast as an ancillary data stream. After inserting the unique broadcast identifier into the second OTA broadcast, the broadcast station 100 broadcasts/transmits the second OTA broadcast (Block 925 of FIG. 9). Similar to the first OTA broadcast, the broadcast station 100 broadcasts/transmits the second OTA broadcast as a one-to-many broadcast. As will be recognized, the second OTA broadcast may be relayed, repeated, or otherwise transmitted via multiple broadcast stations 100 or devices within the broadcast area. Thus, the second OTA broadcast can be received by any number of local devices 105 within the broadcast area.

In one embodiment, as a result of the broadcast station 100 broadcasting/transmitting the second OTA broadcast in the broadcast area, the local device 105 can receive the second OTA broadcast (Block 725 of FIG. 7). As the local device 105 receives the second OTA broadcast, the local device 105 scans for and identifies any unique broadcast identifiers corresponding to the user and/or the local device 105 (Block 730 of FIG. 7). For example, using the user information associated with the local device 105 as a key, for example, the downloaded/preinstalled module, program, or application can be used to identify (e.g., translate) any unique broadcast identifiers that correspond to the user or local device 105.

In one embodiment, after identifying the unique broadcast identifier corresponding to the user or local device 105 in the second OTA broadcast, the local device 105 can proceed with authentication. In one embodiment, to be authenticated, the local device 105 needs to receive the unique broadcast identifier (a) from the authentication server 115 and (b) via the second OTA broadcast from the broadcast station 100 (Block 735 of FIG. 7). Practically, the local device 105 can receive the unique broadcast identifier from the authentication server 115 and temporarily stores it in memory. The local device 105 can also scan for and identify the unique broadcast identifier corresponding to user or local device 105 in the second OTA broadcast. In response to (a) receiving the unique broadcast identifier from both the authentication server 115 and the broadcast station 100 and (b) confirming/determining that the unique broadcast identifiers are the substantially same (e.g., if the condition is equal), the local device 105 can be authenticated (Block 745 of FIG. 7). If, however, the local device 105 does not receive the same unique broadcast identifier from the authentication server 115 and the broadcast station 100 via the second OTA broadcast (e.g., if the condition is not equal), the local device 105 may not be authenticated (Block 740).

In one embodiment, as part of the local device 105 being authenticated, the local device 105 stores the unique broadcast identifier for use in accessing content from the broadcaster via the Internet (or other network). Moreover, the local device 105 (e.g., via a downloaded or preinstalled module, program, or application) can generate and transmit a notification to the authentication server 115 regarding the local device's 105 authentication status. The authentication status may indicate whether and for which channels the user and/or local device 105 has been authenticated. In response to receiving the notification from the local device 105, the authentication server 115 can store the local device's 105 authentication status in association the user account corresponding to the user and/or the local device 105 (Block 1025 of FIG. 10). As will be recognized, at any given time, the authentication server 115 may store or have access to the authentication statuses of any number of local devices 105.

In one embodiment, as an further measure of protection, the broadcaster may require the local device 105 to re-authenticate at predetermined times to receive continued access to its content via the Internet (or other network). For example, the broadcaster may require the local device 105 to be re-authenticated periodically, such as every 30 minutes, once a day, or once a week. In this embodiment, the unique broadcast identifier may automatically expire after a predetermined period of time. In another embodiment, the broadcaster may require continuous re-authentication of the local device 105.

As will be recognized, when authenticating multiple local devices 105, the authentication server 115 can generate a unique broadcast identifier for each local device 105 being authenticated. Thus, at any given time, the broadcast station 100 may broadcast/transmit a burst with numerous unique broadcast identifiers, each uniquely identifying an associated local device 105 and corresponding content access rights. Similarly, a local device 105 may receive numerous unique broadcast identifiers, but only identify (e.g., be able to translate) the unique broadcast identifiers to which it corresponds. As will be recognized, a single OTA broadcast may include a token(s) and any number of unique broadcast identifiers.

The preceding describes a process for authenticating a local device 105 in a broadcast area. In various embodiments, this may allow a broadcaster to confirm that the local device 105 is within or proximate the broadcaster's broadcast area. Thus, after the local device 105 has been authenticated, the broadcaster can provide content to the local device 105 via a network such as the Internet while complying with various distribution regulations.

6. Content Access for Local Device

In one embodiment, after the local device 105 has been authenticated, the local device 105 can access content (e.g., via a user operating the local device 105) via the Internet, for example. As discussed, the content may include television broadcasts, television programs, movies, datacasts, music, images, videos, text, webpages, and/or the like. To access such content, the local device 105 may generate a request for the desired content (Block 750 of FIG. 7). Generally, the request for content may comprise information that can be used to uniquely identify the user and/or local device 105. For example, in one embodiment, the request for content includes the unique broadcast identifier. In another embodiment, the request for content includes user information. In one embodiment, the local device 105 transmits the request for content to the authentication server 115.

In one embodiment, the request for content is received via the authentication server 115 (Block 1030 of FIG. 10). As discussed, the authentication server 115 may be operated by (a) a broadcaster or (b) a party independent of a broadcaster. Thus, the request for content may be received, for example, by the broadcaster or the independent third party. In response to receiving the request for content, the authentication server 115 determines whether the unique broadcast identifier is valid (Block 1035 of FIG. 10), e.g., whether the user (e.g., local device 105) has been authenticated. This may be executed in a variety of ways including by (a) determining whether the unique broadcast identifier has expired, (b) identifying the authentication status associated with the corresponding user account, and/or (c) the like. The authentication server 115 can also determine whether the requested content is content for which the user has access rights based on, for example, the user's location. In response to a determination that the unique broadcast identifier is valid, the authentication server 115 can allow transmission of the content to the local device 105 (Block 1045 of FIG. 10). However, in response to a determination that the unique broadcast identifier is not valid, the authentication server 115 may not allow transmission of the content to the local device 105 (Block 1040 of FIG. 10).

The content can be transmitted to the local device 105 in a variety of ways. For example, in one embodiment, the authentication server 115 can be used to transmit the content from the broadcaster to the local device 105 via the Internet (or other network). In another embodiment, the authentication server 115 can transmit a notification to the broadcaster to provide the specified content to the local device 105 via the Internet (or other network), bypassing the authentication server 115 for distribution of the content. As indicated in Block 755 of FIG. 7, the local device 105 can receive the requested content and display, play, or otherwise provide the same via the local device 105.

In one embodiment, the local device 105 may access content (e.g., via a user operating the local device 105) that is currently being broadcast OTA. For example, the local device may access (e.g., via a user operating the local device 105) the television show "Lost" 35 minutes after the Lost OTA broadcast began. In this example, the authentication server 115 and/or broadcast station 100 may allow the local device 105 to receive the content (e.g., the television show Lost) via a network such as the Internet (a) that is currently being broadcast OTA or (b) from the beginning of the show Lost. As will be recognized, a variety of other approaches and techniques may also be used.

In various embodiments, the described process allows the physical location of the user (e.g., local device 105) to be established. With the physical location of the user (e.g., local device 105) established, the broadcaster or third party can identify content the user is permitted to receive via the Internet (or other network). For example, the broadcaster may simply provide (e.g., stream) its OTA content via the Internet (or other network) to authenticated users (e.g., devices). The broadcaster may also enter into agreements to distribute other content to authenticated users (e.g., devices) over the Internet (or other network) within or associated with the broadcaster's broadcast area. For example, KCRG-TV9 may enter into an agreement with ESPN to distribute ESPN's live content (e.g., content normally only available via a subscription for satellite or cable services) over the Internet (or other network) to authenticated users (e.g., devices) within or associated with KCRG-TV9's broadcast area. Additionally, broadcasters such as KCRG-TV9 may also require a subscription (and fee) to receive ESPN's live content via the Internet (or other network) in KCRG-TV9's broadcast area. In addition to providing such content, the broadcaster may provide VOD content, pay-per-view ("PPV") content, and a variety of other content via the Internet (or other network) to authenticated user (e.g., devices). In various embodiments, these concepts may allow broadcasters to distribute an unlimited amount of content (e.g., channels) to local devices 105 and remote devices 120 via a network such as the Internet. These embodiments can be further used to create virtual broadcast boundaries that, for example, track cable and/or broadcast area boundaries.

7. Content Access for Remote Device

As indicated, the term "remote device" may refer to, for example, a device located outside a specific service area when attempting to access content associated with the service area (e.g., a device located outside a broadcaster's broadcast area when attempting to access the broadcaster's content). In one embodiment, after the local device 105 has been authenticated as being within or proximate a broadcast area, the remote device 120 may be able access the broadcaster's content via the Internet, for example, when outside the broadcast area. To do so, the remote device 120 can first be registered with the local device 105 (Blocks 760, 800 of FIGS. 7 and 8). In one embodiment, registration may include inputting (e.g., via a user operating a device) information associated with the remote device 120 into the local device 105 via a module, program, or application that was downloaded/preinstalled. In another embodiment, registration may include inputting (e.g., via a user operating a device) information associated with the remote device 120 via a webpage of an independent third party. The information associated with the remote device 120 may include information that uniquely identifies the remote device 120, such as a MAC address or other device identifier.

Figure 8:
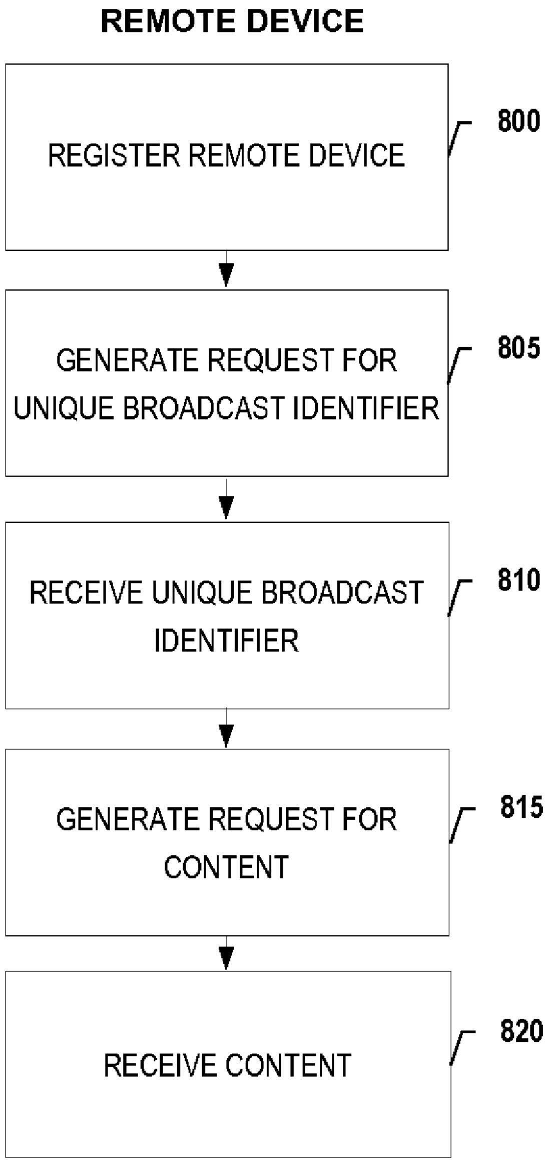

In one embodiment, after the remote device 120 has been registered, the remote device 120 may generate and transmit a request for the unique broadcast identifier to the local device 105 (Block 805 of FIG. 8). The local device 105 can receive the request from the remote device 120, and, in turn, transmit the unique broadcast identifier to the remote device 120 (Blocks 765, 770 of FIG. 7). As indicated in Block 810 of FIG. 8, the remote device 120 can receive the unique broadcast identifier transmitted from the local device 105. As will be recognized, these functions may be executed, for example, via downloaded or preinstalled modules, programs, or applications on the local and remote devices 105, 120.

In one embodiment, after receiving the unique broadcast identifier, to access such content, the remote device 120 may generate a request for the desired content (Block 815 of FIG. 8). Generally, the request for content may comprise information that can be used to uniquely identify the user, local device 105, and/or remote device 120. For example, in one embodiment, the request for content includes the unique broadcast identifier. The request for content can be transmitted to and received by the authentication server 115 (Block 1030 of FIG. 10). As discussed, the authentication server 115 may be operated by (a) a broadcaster or (b) a party independent of a broadcaster. Thus, the request for content may be received, for example, by the broadcaster or the independent third party. In response to receiving the request for content, the authentication server 115 determines whether the unique broadcast identifier is valid (Block 1035 of FIG. 10), e.g., whether the user (e.g., local device 105) has been authenticated. This may be executed in a variety of ways including by (a) determining whether the unique broadcast identifier has expired, (b) identifying the authentication status associated with the corresponding user account, and/or (c) the like. The authentication server 115 can also determine whether the requested content is content for which the user has access rights based on, for example, the user's location. In response to a determination that the unique broadcast identifier is valid, the authentication server 115 can allow transmission of the content to the remote device 120 (Block 1045 of FIG. 10). However, in response to a determination that the unique broadcast identifier is not valid, the authentication server 115 may not allow transmission of the content to the remote device 120 (Block 1040 of FIG. 10).

The content can be transmitted to the remote device 120 in a variety of ways. For example, in one embodiment, the authentication server 115 can be used to transmit the content from the broadcaster to the remote device 120 via the Internet (or other network). In another embodiment, the authentication server 115 can transmit a notification to the broadcaster to provide the specified content to the remote device 120 via the Internet (or other network), bypassing the authentication server 115 for distribution of the content. As indicated in Block 820 of FIG. 8, the remote device 120 can receive the requested content and display, play, or otherwise provide the same via the remote device 120.

In various embodiments, because the local device 105 has been authenticated as having a presence within or proximate the broadcaster's broadcast area, the user's registered remote devices 120 can be used to access content from the broadcaster when outside the broadcast area. For example, a user may take her mobile phone or laptop on a business trip or vacation outside the broadcaster's broadcast area. In such a case, the described authentication can allow the user (or other parties) to access content (e.g., stream a newscast or television program) from the broadcaster even when outside the broadcaster's broadcast area. This may allow the user to access a broadcaster's content regardless of location and/or device.

In one embodiment, the user may be limited in the number of remote devices 120 that can be registered for access to content. For example, the user may only be able to register 5 devices with the local device 105. In various embodiments, this may limit fraud attempts by users in registering friends' or relatives' remote devices 120 for access to content outside a specific broadcast area.

8. Content Metrics

In one embodiment, a broadcaster can monitor metrics associated with the content it distributes to local and remote devices 105, 120. For example, periodic channel scans on local devices 105 and/or remote devices 120 can be executed to obtain information about the content (e.g., channels, VOD content, and PPV content) being received by the devices. This information can then be transmitted by the local and remote devices 105, 120, for example, to (a) the broadcaster or (b) the authentication server 115. In various embodiments, this may allow the broadcaster to obtain viewer metrics, such as who is watching what. Accordingly, precise statistical information regarding user consumption can be obtained. Additionally or alternatively, this may also allow a broadcaster to verify whether a device (e.g., local device 105 and/or remote device 120) is indeed receiving an OTA broadcast.

9. Advertisements

As described, a broadcaster may enter into agreements to distribute content from other parties within specific broadcast areas. For example, KCRG-TV9 may enter into an agreement with ESPN to distribute ESPN's live content over the Internet (or other network) to authenticated users (e.g., devices) within or associated with KCRG-TV9's broadcast area. By identifying the actual physical location of the local device 105, the broadcaster or independent third party may sell targeted advertising positions for its content. For example, for content provided by KCRG-TV9 via the Internet (or other network), KCRG-TV9 may sell advertising positions to clients interested in targeting an audience in Cedar Rapids, Iowa. In various embodiments, this may allow a broadcaster to sell local advertising positions for insertion into the content provided via the Internet (or other network).

IV. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for authenticating a local device in a broadcast area, the method comprising:

broadcasting, via a broadcast station, a first over-the-air broadcast, wherein (a) the broadcast station is associated with a broadcast area and (b) the first over-the-air broadcast comprises a token;

receiving, via the broadcast station, a unique broadcast identifier from an authentication server, wherein (a) the unique broadcast identifier is generated based at least in part on (i) the token in the first over-the-air broadcast and (ii) at least a portion of user information transmitted from a local device that received the token in the first over-the-air broadcast, and (b) the unique broadcast identifier is transmitted by the authentication server to be received by the local device; and broadcasting, via the broadcast station, a second over-the-air broadcast in the broadcast area, wherein the second over-the-air broadcast comprises the unique broadcast identifier to be received by the local device.

2. The method of claim 1 further comprising generating, via the broadcast station, the token for broadcast via the first over-the-air broadcast.

3. The method of claim 1 further comprising receiving, via the broadcast station, the token from the authentication server.

4. The method of claim 1 further comprising:

after the local device being authenticated as within the broadcast area, receiving a request to transmit content to the authentication server for transmission to the local device; and after receiving the request to transmit content to the authentication server for transmission to the local device, transmitting the content to the authentication server.

5. The method of claim 1 further comprising:

after the local device being authenticated as within the broadcast area, receiving a request to transmit content to the local device; and after receiving the request to transmit content to the local device, transmitting the content to the local device.

6. The method of claim 5 further comprising monitoring the content requested by the local device.

7. The method of claim 1 further comprising:

after the local device being (a) authenticated as within the broadcast area and (b) associated with a remote device, receiving a request to transmit content to the authentication server for transmission to the remote device; and after receiving the request to transmit content to the authentication server for transmission to the remote device, transmitting the content to the authentication server.

8. The method of claim 7 further comprising monitoring the content requested by the authentication server.

9. The method of claim 1 further comprising:

after the local device being (a) authenticated as within the broadcast area and (b) associated with a remote device, receiving a request to transmit content to the remote device; and after receiving the request to transmit content to the remote device, transmitting the content to the remote device.

10. The method of claim 1, wherein the unique broadcast identifier identifies content for which a user associated with the user information has rights to access.

11. The method of claim 1, wherein the token and the unique broadcast identifier are encrypted.

12. The method of claim 1, wherein the token identifies the broadcast station transmitting the first over-the-air broadcast.

13. The method of claim 1, wherein the user information is selected from the group consisting of a username, a charge card number, an address, a telephone number, and a local device identifier.

14. A broadcast system for authenticating a local device in a broadcast area, the broadcast system comprising one or more processors, one or more memory storage areas, and one or more transmitters, the broadcast system configured to:

broadcast a first over-the-air broadcast, wherein (a) the first over-the-air broadcast comprises a token and (b) the broadcast system is associated with a broadcast area;

receive a unique broadcast identifier from an authentication server, wherein (a) the unique broadcast identifier is generated based at least in part (i) the token in the first over-the-air broadcast and (ii) at least a portion of user information that identifies a local device that received the token in the first over-the-air broadcast, and (b) the unique broadcast identifier is transmitted by the authentication server to be received by the local device; and broadcast a second over-the-air broadcast in the broadcast area, wherein the second over- the-air broadcast comprises the unique broadcast identifier to be received by the local device.

15. The broadcast system of claim 14 further configured to generate the token for broadcast via the first over-the-air broadcast.

16. The broadcast system of claim 14 further configured to receive the token from the authentication server.

17. The broadcast system of claim 14 further configured to:

after the local device being authenticated as within the broadcast area, receive a request to transmit content to the authentication server for transmission to the local device; and after receiving the request to transmit content to the authentication server for transmission to the local device, transmit the content to the authentication server.

18. The broadcast system of claim 14 further configured to:

after the local device being authenticated as within the broadcast area, receive a request to transmit content to the local device; and after receiving the request to transmit content to the local device, transmit the content to the local device.

19. The broadcast system of claim 18 further configured to monitor the content requested by the local device.

20. The broadcast system of claim 14 further configured to:

after the local device being (a) authenticated as within the broadcast area and (b) associated with a remote device, receive a request to transmit content to the authentication server for transmission to the remote device; and after receiving the request to transmit content to the authentication server for transmission to the remote device, transmit the content to the authentication server.

21. The broadcast system of claim 20 further configured to monitor the content requested by the authentication server.

22. The broadcast system of claim 14 further configured to:

after the local device being (a) authenticated as within the broadcast area and (b) associated with a remote device, receive a request to transmit content to the remote device; and after receiving the request to transmit content to the remote device, transmit the content to the remote device.

23. The broadcast system of claim 14, wherein the unique broadcast identifier identifies content for which a user associated with the user information has rights to access.

24. The broadcast system of claim 14, wherein the token and the unique broadcast identifier are encrypted.

25. The broadcast system of claim 14, wherein the token identifies the broadcast system transmitting the first over-the-air broadcast.

26. The broadcast system of claim 14, wherein the user information is selected from the group consisting of a username, a charge card number, an address, a telephone number, and a local device identifier.

27. The broadcast system of claim 14, wherein the token is a data string.

28. The method of claim 1, wherein the token is a data string.

* * * * *